United States Patent [19]

Shimizu et al.

[11] Patent Number: 4,622,438
[45] Date of Patent: Nov. 11, 1986

[54] SUBSCRIBER LINE RADIO CONCENTRATION SYSTEM WITH AUTOMATIC RESPONSE FOR A LOOP BACK TEST

[75] Inventors: Takafumi Shimizu, Kawasaki; Ichiro Tomizawa, Tokyo, both of Japan

[73] Assignee: Fujitsu Limited, Kawasaki, Japan

[21] Appl. No.: 674,827

[22] Filed: Nov. 26, 1984

[30] Foreign Application Priority Data

Nov. 29, 1983 [JP] Japan .................. 58-223123

[51] Int. Cl.⁴ .............................................. H04B 3/46
[52] U.S. Cl. ...................................... 379/63; 361/187; 379/22; 379/27; 379/333
[58] Field of Search ........... 179/2 EA, 175.3 R, 81 R, 179/2 E, 2 EB; 455/67; 361/182, 184, 187

[56] References Cited

U.S. PATENT DOCUMENTS 4,560,842 12/1985 Homer .................. 179/175.3 R X

Primary Examiner—Stafford D. Schreyer
Attorney, Agent, or Firm—Staas & Halsey

[57] ABSTRACT

In a subscriber line radio concentration system for concentrating a plurality of subscriber terminal stations through radio channels to a master station, at least one of the subscriber terminal stations comprises an automatic response equipment. The automatic response equipment can automatically respond to a continuous ringing signal from the master station, thereby enabling a loop back test to be carried out automatically without the necessity of the attendance at the subscriber station of maintenance or other personnel.

11 Claims, 10 Drawing Figures

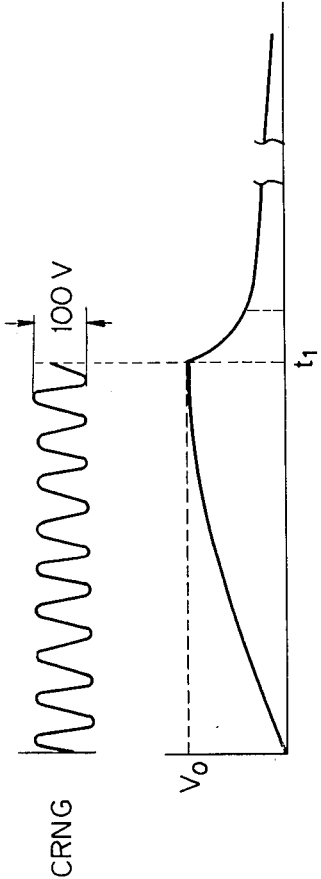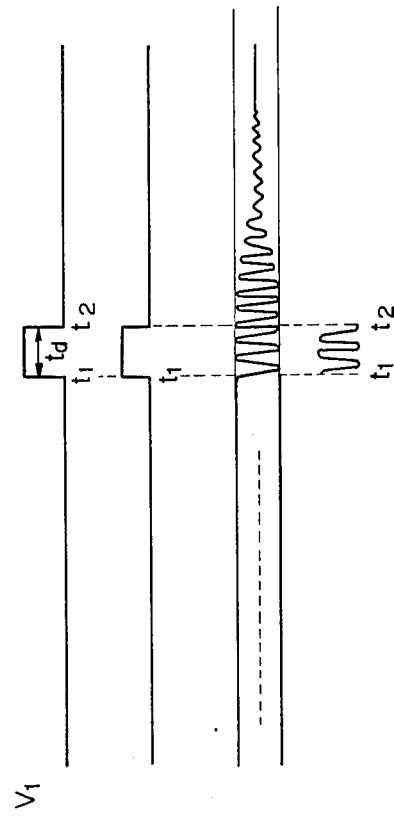
Fig. 4A
Fig. 4B
Fig. 4C
Fig. 4D
Fig. 4E
Fig. 4F

SUBSCRIBER LINE RADIO CONCENTRATION SYSTEM WITH AUTOMATIC RESPONSE FOR A LOOP BACK TEST

BACKGROUND OF THE INVENTION (1) Field of the Invention

The present invention relates to a subscriber line radio concentration system. More particularly, it relates to a subscriber line radio concentration system (in other words, a multiple access radiotelephone system) having an automatic response unit suitable for a loop back test pertaining to a transmission test of access lines from a master station (servicing switching center) to a user (subscriber) terminal equipment.

(2) Description of the Related Art

In the multiple access radiotelephone system, both the master station and the subscriber terminal station cannot be constantly supervised by maintenance personnel. Therefore, to determine whether or not the communication channel between the master station and the subscriber terminal station is defective, it is desirable that a loop back test be carried out automatically.

In the conventional loop back test, however, it is necessary for someone such as a maintenance engineer to be in attendance at the called subscriber terminal station. Such personal attendance is necessary because, when a call is effected from a master station to a subscriber terminal station, the connection of the communication channel between the calling master station and the called subscriber terminal station is acknowledged only when an individual, in response to a ringing tone at the called subscriber terminal station, lifts the handset of the telephone set and responds to the call. Therefore, conventionally, a fully automatic loop back test cannot be carried out.

SUMMARY OF THE INVENTION

In view of the above-mentioned problem, an object of the present invention is to provide a subscriber line radio concentration system which can automatically carry out a loop back test from a master station to a subscriber terminal station.

To attain the above object, there is provided a subscriber line radio concentration system for concentrating a plurality of subscriber terminal stations through radio channels to a master station, wherein at least one of the subscriber terminal stations comprises an automatic response equipment. The automatic response equipment comprises: a ringing signal rectifying circuit for rectifying a ringing signal transmitted from the master station through a subscriber line to the subscriber terminal station; a charging circuit for boosting the voltage rectified by the ringing signal rectifying circuit; a voltage-stabilizing circuit for providing a constant voltage when the output voltage from the charging circuit exceeds a predetermined value; an oscillating circuit for generating a predetermined signal when the constant voltage is generated from the voltage-stabilizing circuit; and a quasi OFF HOOK setting circuit for conducting the predetermined signal from the oscillating circuit through the subscriber line to the master station.

BRIEF DESCRIPTION OF THE DRAWINGS

The above objects and features of the present invention will be more apparent from the following description of the preferred embodiment with reference to the accompanying drawings, wherein:

FIGS. 4A through 4F are waveform diagrams illustrating the voltages at various points in the automatic response equipment shown in FIG. 3.

DESCRIPTION OF THE PREFERRED EMBODIMENTS

Figure 1:
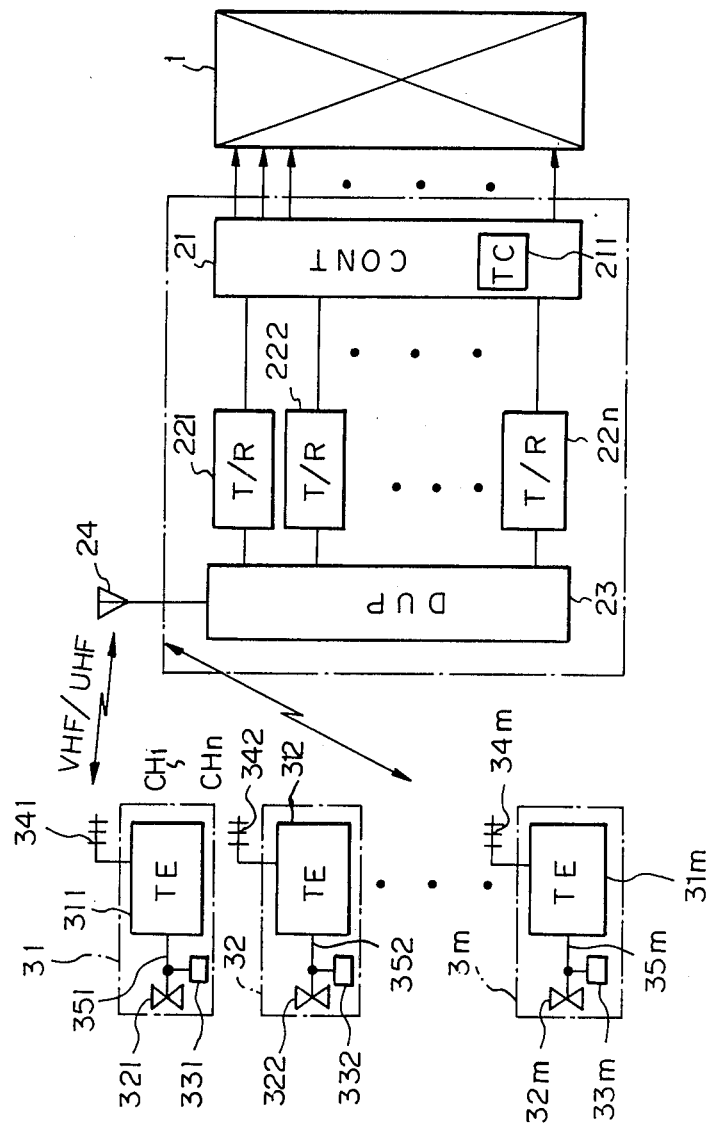
FIG. 1 is a block diagram illustrating a multiple access radiotelephone system, according to an embodiment of the present invention.

FIG. 1 shows a multiple access radiotelephone system according to an embodiment of the present invention. In FIG. 1, 1 designates exchange equipment; 2 a master station; and $3l$ through $3m$ a plurality of subscriber terminal stations. The subscriber terminal stations $3l$ through $3m$ are remote from the master station 2. For example, the subscriber terminal station $3l$ is separated from the master station 2 by a distance of, for example, 300 km. Accordingly, the subscriber terminal stations $3l$ through $3m$ are associated with the master station 2 via duplex radio channels $CH_1$ through $CH_n$. The suffix m of the subscriber terminal stations $3l$ through $3m$ represents a number of stations, for example, 120. The suffix n of the radio channels $CH_1$ through $CH_n$ usually represents a number smaller than that represented by m. For example, eight radio channels $CH_1$ through $CH_8$ are provided. Calls are made via idle channels.

The master station 2 consists of a control equipment (CONT) 21, transmitter/receiver equipment (T/R) $22l$ through $22n$, and an antenna duplex equipment (DUP) 2. The antenna duplex equipment 23 is connected to a nondirectional antenna 24.

Each of the subscriber terminal stations $3i$ (i=1, 2, 3, ..., or m) consists of a terminal equipment (TE) $31i$, a telephone set $32i$, and an automatic response equipment $33i$ which is provided according to the present invention. The terminal equipment (TE) $32i$ is connected to a directional antenna $34i$. The telephone equipment $32i$ and the automatic response unit $33i$ are connected through a subscriber line $35i$ to the terminal equipment (TE) $31i$.

The control equipment 21 controls the whole system. In particular, it acts to specify one of the duplex channels $CH_1$ through $CH_n$ and one of the subscriber terminal stations $3l$ through $3m$. The control equipment 21 includes a test-call unit 211 for carrying out a loop back test between the selected station of the subscriber terminal stations $3l$ through $3m$ and the master station 2.

When the control equipment 21 specifies one of the subscriber terminal stations $3l$ through $3m$ and one of the channels $CH_1$ through $CH_n$, and when the test call unit 211 is driven in such a manner that an examination mode is set, the master station calls the specified subscriber terminal station, for example, $3l$, through the specified channel, for example, $CH_1$, by sending a continuous ringing signal. The continuous ringing signal is thus provided on, for example, the subscriber line 351, and this ringing signal on the subscriber line 351 generates a continuous ringing tone at the telephone set 321.

Conventionally, the connection between the telephone equipment 321 in the subscriber terminal equipment 31 and the control equipment in the master station 2 is acknowledged by lifting the handset of the telephone set 321 in response to the continuous ringing tone. Therefore, if there is no-one present in the vicinity of the telephone set 321, the connection test cannot be performed.

Conversely, according to the present invention, the continuous ringing signal on the subscriber line 351 is applied also to the automatic response equipment 331. The automatic response equipment 331 then automatically generates an audio signal which is returned back through the subscriber line 351 to the master station 2, as later described in more detail. Thus, the loop back test can be carried out fully automatically and without the necessity for attendance by maintenance or other personnel.

Figure 2:
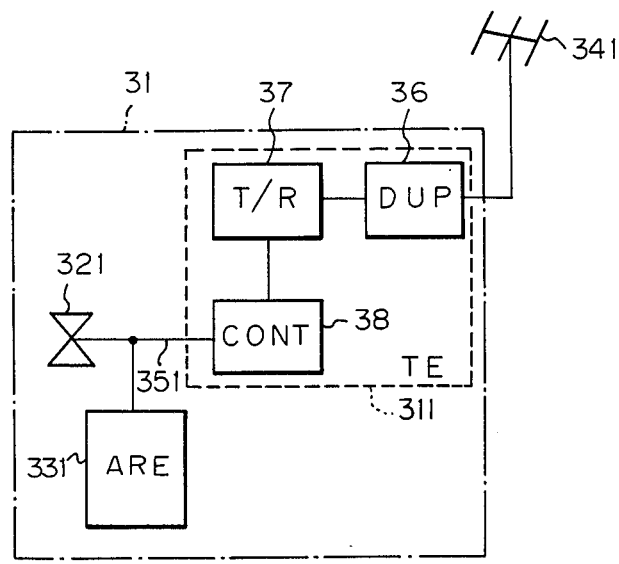
FIG. 2 is a block diagram illustrating one of the subscriber terminal stations shown in FIG. 1.

FIG. 2 is a block diagram illustrating in more detail one of the subscriber terminal stations 3l through 3m. In FIG. 2, the terminal equipment (TE) 311 in the subscriber terminal station 3l includes an antenna duplexer (DUP) 36, a transmitter/receiver equipment (T/R) 37, and a control equipment (CONT) 38.

Instead of providing the telephone set 321 and the automatic response equipment (ARE) 331 within the subscriber terminal station 3l, these units may be located remote from the terminal equipment 311. In this case, the subscriber line 351 may be a long-distance cable or may be a wireless radio channel.

Figure 3:
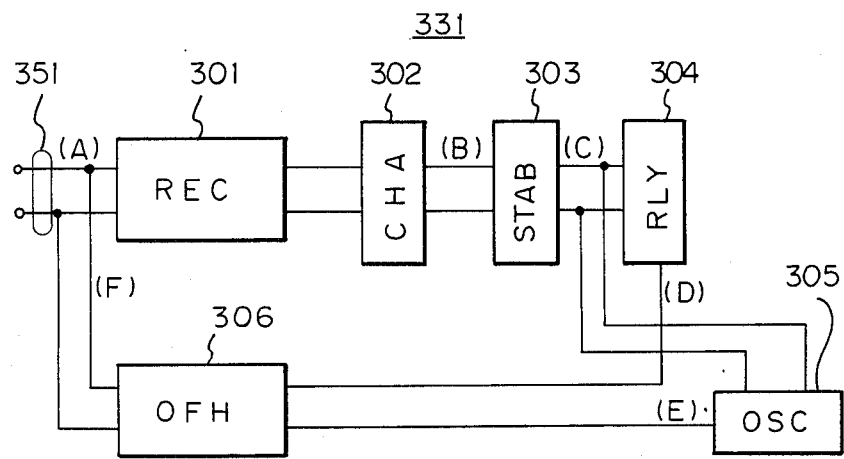
FIG. 3 is a block diagram illustrating an automatic response equipment in the subscriber terminal station shown in FIG. 2.

FIG. 3 is a block diagram illustrating the automatic response equipment (ARE) 331 in more detail. In FIG. 3, the automatic response equipment (ARE) 331 includes a ringing signal rectifying circuit (REC) 301 for rectifying the ringing signal transmitted from the master station 2 to the subscriber line 351, a charging circuit (CHA) 302 for charging the voltage rectified by the ringing signal rectifying circuit 301, a voltage-stabilizing circuit (STAB) 303 for providing a constant voltage $V_1$ when the output voltage from the charging circuit 302 exceeds a predetermined voltage $V_0$, a relay circuit (RLY) 304 driven by the above-mentioned constant voltage $V_1$ output from the voltage-stabilizing circuit 303, an oscillating circuit (OSC) 305 for generating a signal having a predetermined frequency $f_0$, and a quasi OFF HOOK setting circuit (OFH) 306 for transferring the signal from the oscillating circuit 306 to the subscriber line 351 when the relay circuit (RLY) 304 is activated.

FIGS. 4A through 4E are waveform diagrams illustrating the voltage at respective points A, B, C, D, E, and F in the automatic response equipment 331 shown in FIG. 3.

FIG. 4A shows the waveform of the continuous ringing signal CRNG supplied from the master station 2 to the subscriber line 351. The peak-to-peak voltage is about 100 V. In the loop back test mode, the continuous ringing signal is transmitted instead of the intermittent ringing signal transmitted in a usual call. After rectifying the continuous ringing signal CRNG by the rectifying circuit 301, the output thereof is boosted by the charging circuit (CHA) 302, resulting in the waveform as shown in FIG. 4B. In FIG. 4B, the output voltage of the charging circuit 302 reaches the reference voltage $V_0$ at a time $t_1$. The voltage stabilizing circuit (STAB) 303 then provides the constant voltage $V_1$ for a predetermined period $t_d$ from the time $t_1$. In response to the constant voltage $V_1$, the relay circuit 304 is activated for that period $t_d$ as shown in FIG. 4D. Also, by the constant voltage $V_1$, the oscillation circuit 305 begins to generate the signal having the frequency $f_0$ as shown in FIG. 4E. The frequency $f_0$ preferably may be an audio frequency. In response to the operation of the relay circuit (RLY) 304, the quasi OFF HOOK setting circuit (OFH) 306 forms a quasi OFF HOOK circuit, which is identical to the state of lifting up of the handset of the telephone set. Thus, the signal having the frequency $f_0$ is transferred, during the period $t_d$, from the oscillating circuit (OSC) 305 through the quasi OFF HOOK setting circuit 306 to the subscriber line 351, as shown in FIG. 4F.

Once the connection is established between the master station 2 and the subscriber terminal station 31 through the quasi OFF HOOK setting circuit 306, the test call unit (TC) 211 in the control equipment 21 (in FIG. 1) stops the transfer of the continuous ringing signal CRNG at the time $t_1$. Therefore, the charging circuit (CHA) 302 begins to discharge from the time $t_1$, so that its output voltage gradually decreases as shown in FIG. 4B. When the output voltage of the voltage stabilizing circuit 303 turns to zero volts at a time $t_2$, as shown in FIG. 4C, the relay circuit (RLY) 304 is released from its activated state and the connection between the oscillating circuit 305 and the subscriber line 351 is cut in the quasi OFF HOOK circuit 306. Thus, the connection test between the master station 2 and the subscriber terminal station 3l can be automatically carried out without the attendance of any personnel.

It should be noted that the automatic response equipment 331 has another advantage in that it does not need any specific power supply unit such as an AC power supply, since it utilizes the rectified output of the continuous ringing signal CRNG as a power supply voltage.

Figure 5:
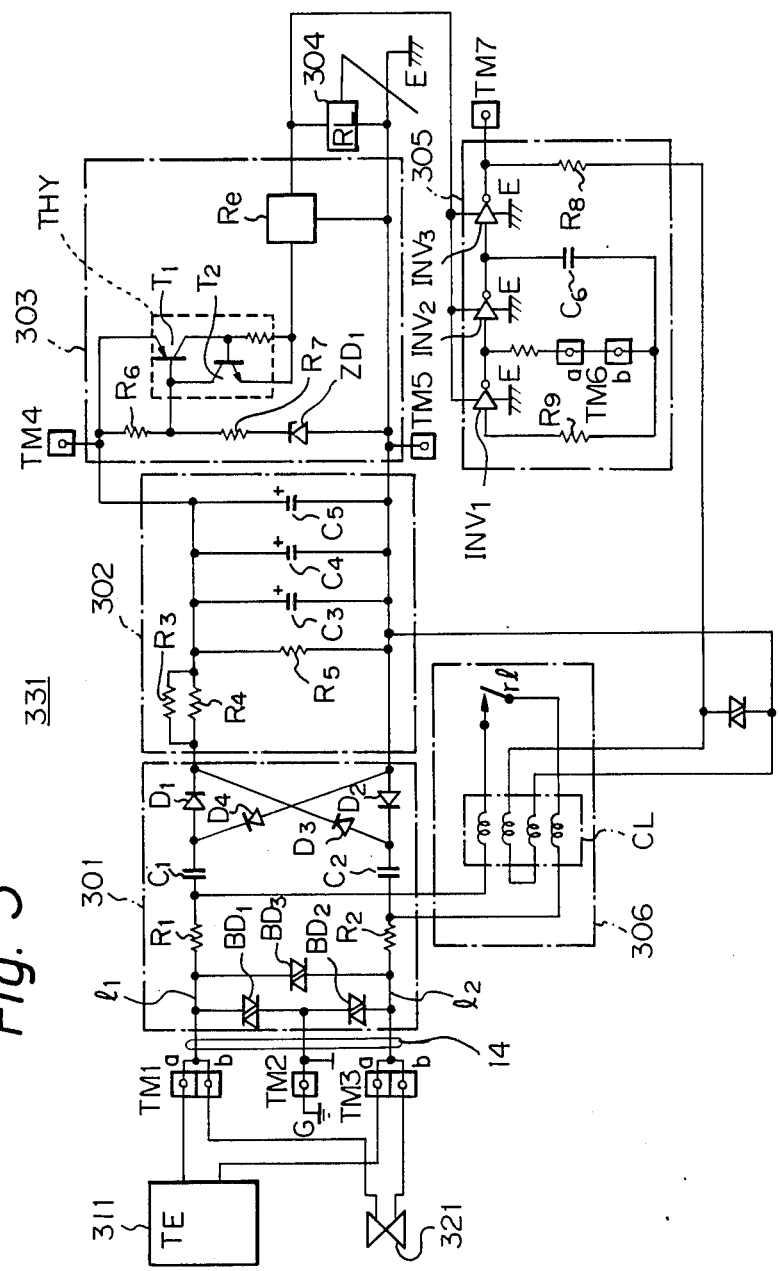
FIG. 5 is a circuit diagram illustrating the automatic response equipment in detail.

FIG. 5 is a circuit diagram illustrating the automatic response equipment 331 in more detail.

In FIG. 5, TMI through TM7 are terminals. The terminal TM2 is connected to a first ground G connected to the earth. The ringing signal rectifying circuit 301 is formed by varistor diodes $BD_1$ through $BD_3$ for protecting lines $l_1$ and $l_2$ against a surge current applied thereto, resistors $R_1$ and $R_2$ having small resistances of, for example, 5 through 10 ohms, for protecting a relay contact rl, coupling capacitors $C_1$ and $C_2$, and a diode bridge consisting of diodes $D_1$ through $D_4$ for obtaining a full-wave rectified current.

The charging circuit 302 is formed by resistors $R_3$ through $R_5$ and capacitors $C_3$ through $C_5$. The time constant for charging is determined by the resistances of the resistors $R_3$ and $R_4$ and the capacitances of the capacitors $C_3$ through $C_5$. The resistor $R_5$ is provided for determining the discharge time constant. By appropriately setting these resistances and capacitances, the output voltage at the terminal TM4 will not reach the predetermined voltage $V_0$ unless the continuous ringing signal CRNG is applied to the terminals TM1 and TM3. That is, even when an intermittent ringing signal is applied to the terminals TM1 and TM3, the charges in the capacitors $C_3$ through $C_5$ are discharged through the resistor $R_5$ so that the voltage at the terminal TM4 does not reach the voltage $V_0$.

The voltage stabilizing circuit 303 consists of resistors $R_6$ and $R_7$, a Zener diode $ZD_1$, a thyristor THY including a PNP transistor $T_1$ and an NPN transistor $T_2$, and a voltage regulator Re. When the voltage at the terminal TM4 is lower than the predetermined voltage $V_0$, the thyristor THY is in an off state. When the voltage at the terminal TM4 reaches the voltage $V_0$, the Zener diode $ZD_1$ conducts a current so that the base current of the transistor $T_1$ is drawn from the base of the transistor $T_1$ to the Zener diode $ZD_1$, resulting in an on state of the thyristor THY. The voltage regulator Re provides the constant voltage $V_1$ when the thyristor THY is in an on state.

By the constant voltage $V_1$, the relay circuit RL is activated so that the relay contact rl is closed. Also, the constant voltage $V_1$ is applied to the oscillating circuit 305. E is a second ground connected to the ground line in the automatic response equipment 331.

The oscillating circuit 305 includes three inverters $INV_1$ through $INV_3$, resistors $R_8$ and $R_9$, and a capacitor $C_6$. When the $INV_1$, $INV_2$, and $INV_3$ connected in series receive the constant voltage $V_1$, the oscillating circuit 305 generates the signal having the frequency $f_0$ at the terminal TM7.

The quasi OFF HOOK setting circuit 306 includes the relay contact rl which is opened or closed in response to the output of the relay circuit 304, and coils CL which are magnetically coupled to the oscillating signal from the oscillating circuit 305. Thus, when the relay contact rl is closed, the oscillating signal is supplied through the lines $l_1$ and $l_2$ and through the terminals TM1 and TM3 to the terminal equipment (TE) 311 (FIG. 2). As a result, a loop is formed between the automatic response equipment (ARE) 331 and the control equipment 21 in the master station 2.

Although the above description mentions only the subscriber terminal station 31$l$, the explanation therein may be also applied to the other subscriber terminal stations 312 through 31$m$.

The present invention is not restricted to the above-mentioned embodiments, since various changes and modifications are possible within the scope of the invention. For example, the automatic response equipment 33$i$ and the telephone set 32$i$ (i=1, 2, ..., or m) may be assembled into a single body.

Further, between the terminal equipment 31$i$ and the telephone set 32$i$ or the automatic response equipment 33$i$, other transit trunks may be provided. The important feature of this invention is that the automatic response equipment 33$i$ is provided at the final stage of the communication line.

Still further, instead of assembling the control equipment 211 in the main station 2, the control equipment 211 may be connected via radio channels to the transmitter/receiver equipments (T/R) 22$l$ through 22$n$.

Still further, the continuous ringing signal CRNG may be applied from outside of the exchange equipment 1.

From the foregoing description, it will be apparent that, according to the present invention, in a subscriber line radio concentration system, a loop back test from a master station to a subscriber terminal station can be automatically carried out without the attendance of any personnel at the subscriber terminal station. In particular, for a public telephone set provided at a place so remote from the master station that it is extremely inconvenient to dispatch maintenance personnel to that location, the automatic response equipment, when provided in the public telephone box, makes the loop back test easy.

We claim:

1. A subscriber line radio concentration system for concentrating a plurality of subscriber terminal stations through radio channels to a master station, at least one of said subscriber terminal stations comprising an automatic response equipment;

said automatic response equipment comprising:
- a ringing signal rectifying circuit for rectifying a ringing signal transmitted from said master station through a subscriber line to said subscriber terminal station,
- a charging circuit for boosting the voltage rectified by said ringing signal rectifying circuit;
- a voltage-stabilizing circuit for providing a constant voltage when the output voltage from said charging circuit exceeds a predetermined value;
- an oscillating circuit for generating a predetermined signal when said constant voltage is generated from said voltage-stabilizing circuit; and
- a quasi OFF HOOK setting circuit for conducting said predetermined signal from said oscillating circuit through said subscriber line to said master station.

2. A subscriber line concentration system as set forth in claim 1, wherein said voltage-stabilizing circuit provides said constant voltage only when said ringing signal is continuous for a predetermined period.

3. A subscriber line concentration system as set forth in claim 1, wherein said predetermined signal generated by said oscillating circuit is an audio signal.

4. A subscriber line concentration system as set forth in claim 1, further comprising a relay circuit driven by said constant voltage, said quasi OFF HOOK setting circuit being adapted to conduct said predetermined signal in response to the output of said relay circuit.

5. A subscriber line concentration system as set forth in claim 4, wherein said constant voltage from said voltage-stabilizing circuit is adapted to be applied to said relay circuit and to said oscillating circuit as a power supply voltage.

6. A subscriber line concentration system as set forth in claim 1, wherein said quasi OFF HOOK setting circuit comprises coils for magnetically coupling said predetermined signal with said subscriber line, and a relay contact for forming a loop between said oscillating circuit and said master station when said relay circuit is activated by said constant voltage applied from said voltage-stabilizing circuit.

7. A subscriber line concentration system as set forth in claim 1, wherein said oscillating circuit comprises odd number of inverters connected in series, said inverters being adapted to receive said constant voltage as their power supply voltage.

8. A subscriber line concentration system as set forth in claim 1, wherein at least one of said subscriber terminal stations comprises: terminal equipment including an antenna duplexer, transmitter/receiver equipment connected to said antenna duplexer, and control equipment connected to said transmitter/receiver equipment; and a telephone set;

said telephone set and said automatic response equipment being connected through a cable subscriber line to said terminal equipment.

9. A subscriber line concentration system as set forth in claim 1, wherein at least one of said subscriber terminal stations comprises: terminal equipment including an antenna duplexer, transmitter/receiver equipment connected to said antenna duplexer, and control equipment connected to said transmitter/receiver equipment; and a telephone set;

said telephone set and said automatic response equipment being connected through a radio channel to said terminal equipment.

10. A subscriber line concentration system as set forth in claim 1, wherein said master station comprises a control equipment including a test call unit for carrying out a loop back test, a plurality of transmitter/receiver equipments connected to said control equipment, and an antenna duplexer connected to said transmitter/receiver equipments, said control equipment being connected via wires to said transmitter/receiver equipments.

11. A subscriber line concentration system as set forth in claim 1, wherein said master station comprises a control equipment including a test call unit for carrying out a loop back test, a plurality of transmitter/receiver equipments connected to said control equipment, and an antenna duplexer connected to said transmitter/receiver equipments, said control equipment being connected via radio channels to said transmitter/receiver equipments.

* * * * *